Figure 1:
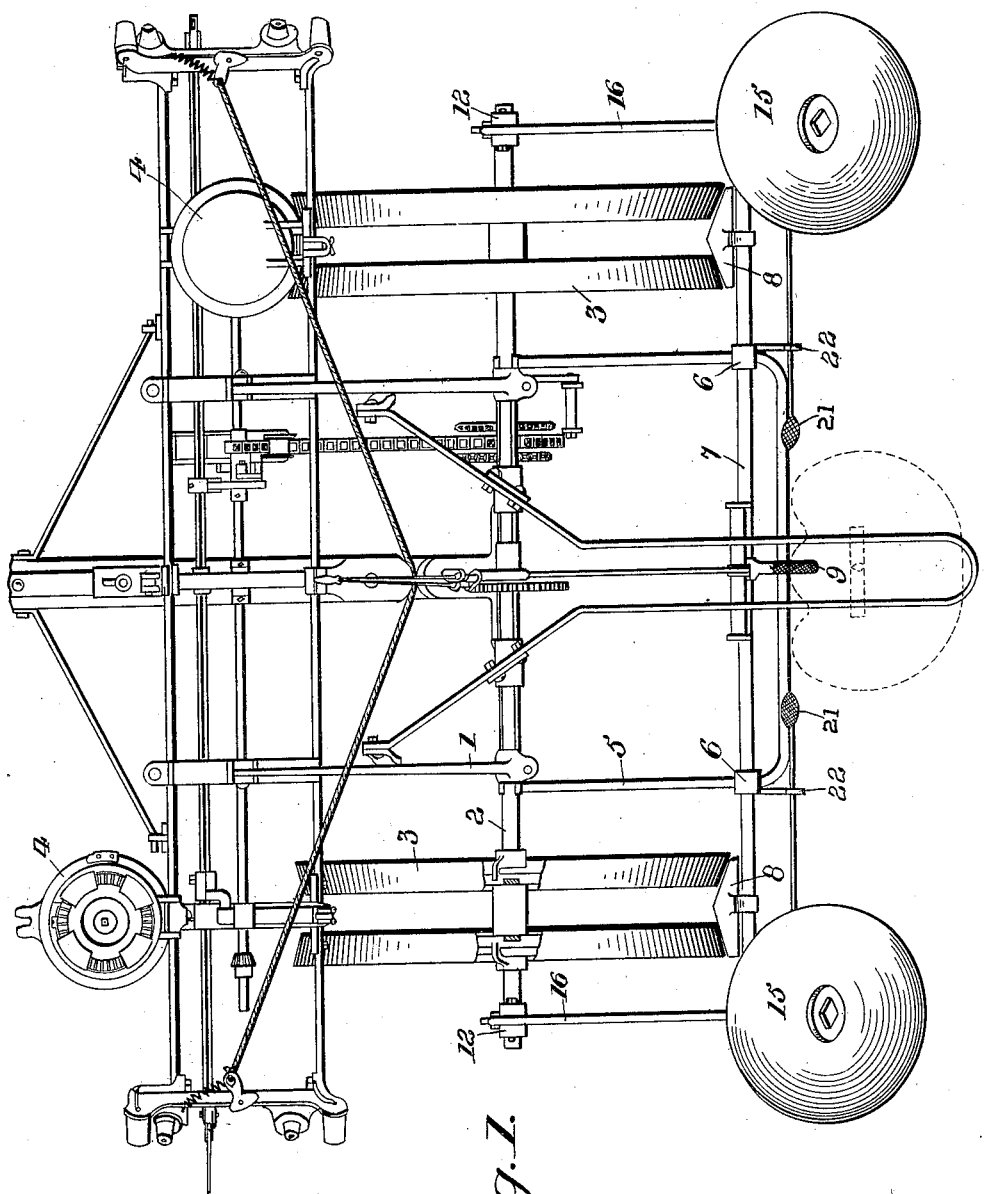

J. B. BARTHOLOMEW.
MARKER MECHANISM FOR PLANTERS.
APPLICATION FILED JUNE 21, 1911. RENEWED AUG. 6, 1913.

1,092,007.

Patented Mar. 31, 1914.

3 SHEETS—SHEET 1.

WITNESSES
C. N. Walker.
S. Jay Teller

INVENTOR
J. B. Bartholomew
By H. H. Bliss
Attorney

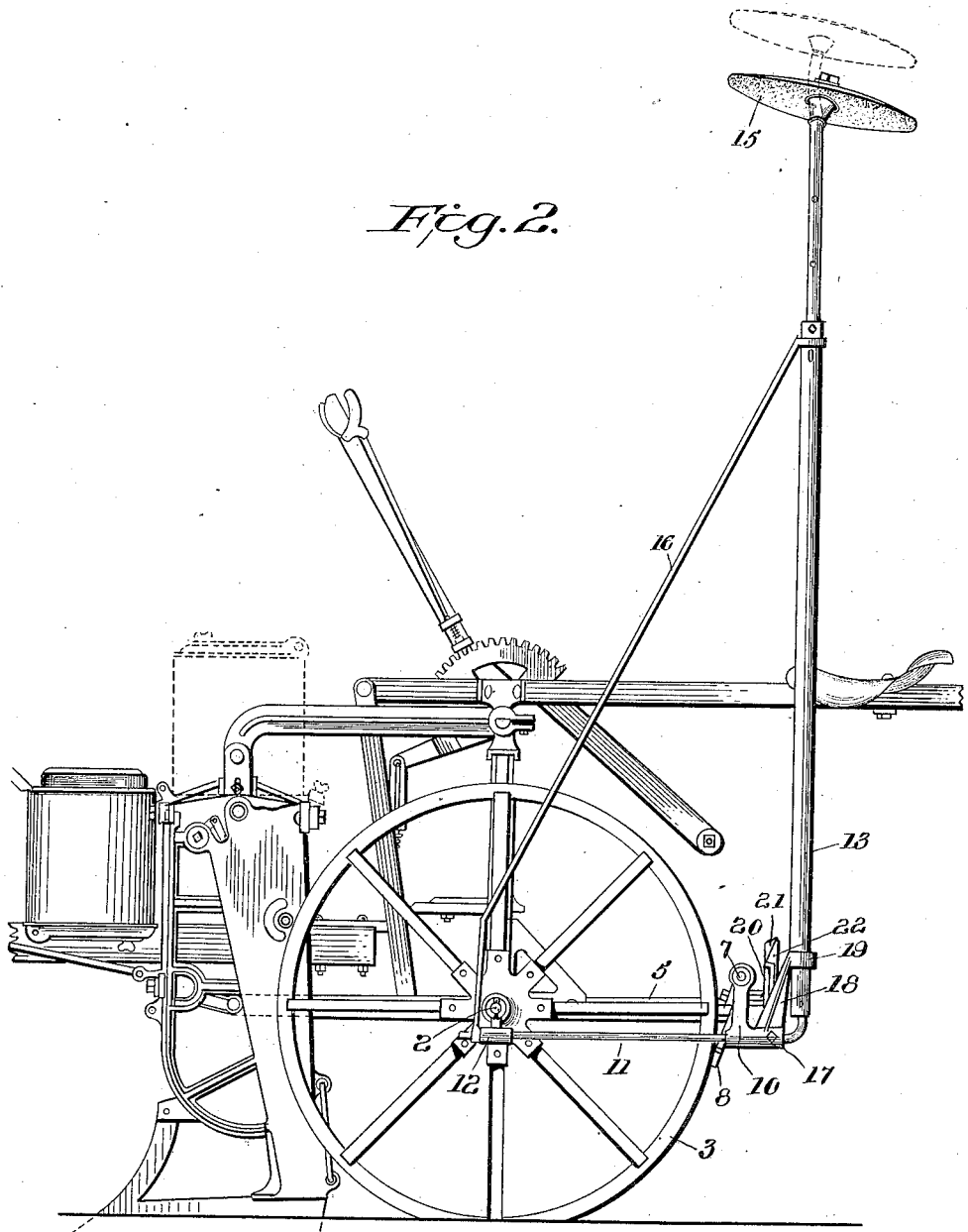

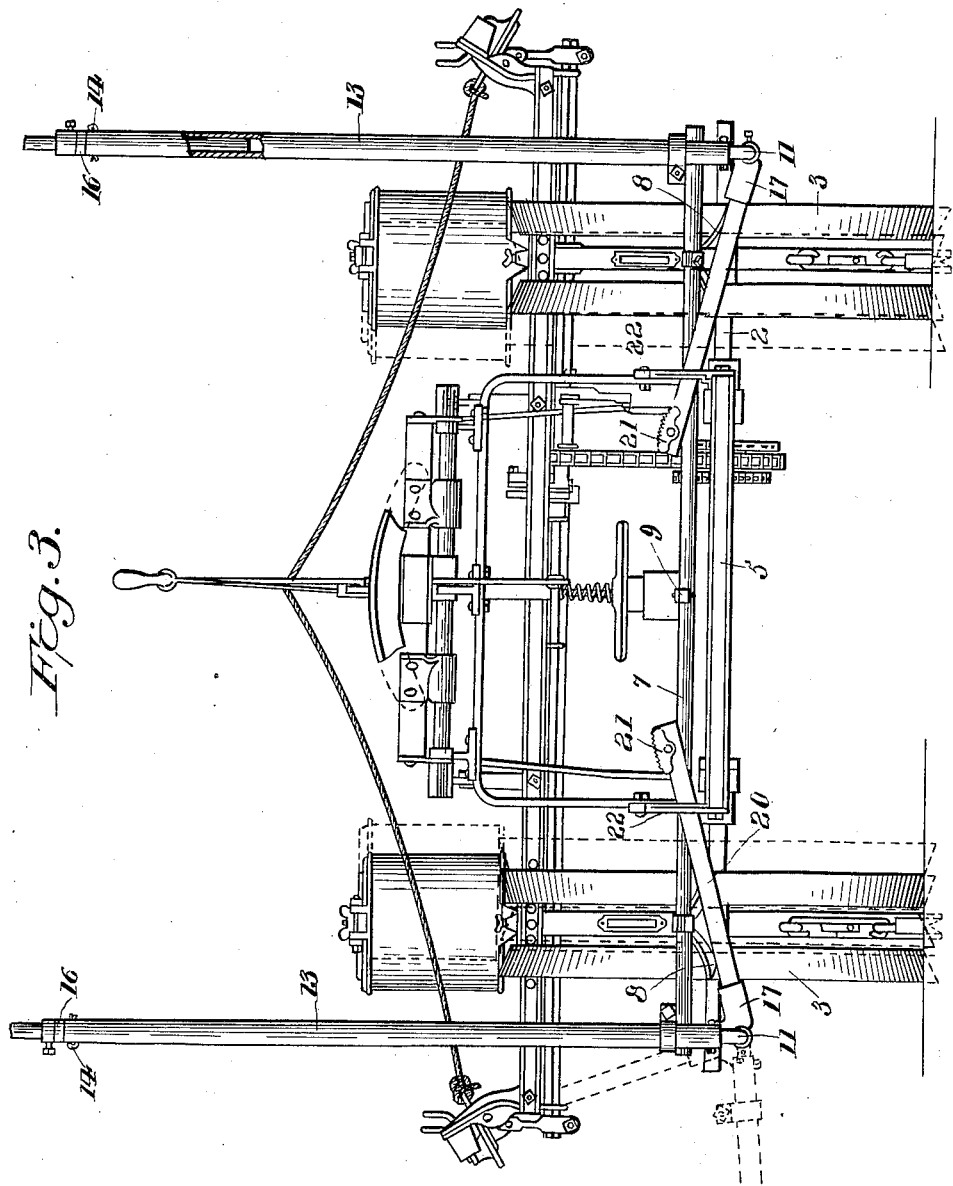

UNITED STATES PATENT OFFICE.

JOHN B. BARTHOLOMEW, OF PEORIA, ILLINOIS, ASSIGNOR TO AVERY COMPANY, A CORPORATION OF ILLINOIS.

MARKER MECHANISM FOR PLANTERS.

1,092,007.  Specification of Letters Patent.  Patented Mar. 31, 1914.

Original application filed March 6, 1908, Serial No. 419,434. Divided and this application filed June 21, 1911, Serial No. 634,508. Renewed August 6, 1913. Serial No. 783,411.

*To all whom it may concern:*

Be it known that I, JOHN B. BARTHOLOMEW, a citizen of the United States, residing at Peoria, in the county of Peoria and State of Illinois, have invented certain new and useful Improvements in Marker Mechanisms for Planters, of which the following is a specification, reference being had therein to the accompanying drawing.

This invention relates to planters adapted for planting corn, and has especially to do with devices for making marks on the ground to be followed in planting adjacent rows.

One of the objects of the invention is to provide a marking device having improved means of attachment to the planter frame and having improved controlling means.

Other objects will be apparent from the following specification.

In the accompanying drawings I have shown the embodiment of my invention which is now deemed preferable.

Of the drawings, Figure 1 is a plan view of a planter having marking devices and associated parts embodying my invention. Fig. 2 is a side elevation of the planter shown in Fig. 1. Fig. 3 is a rear elevation.

Referring to the drawings, 1 represents as a whole the frame of a planter. This frame is mounted upon the axle 2 which is supported by the ground wheels 3, 3. The seeder mechanisms of the planter are indicated by 4, 4.

The frame of the planter comprises a horizontal rearward extending U-shaped part 5. At the rear end of this U-shaped part there is mounted in suitable bearings 6, 6, a rotatable shaft 7. Secured to this shaft are scrapers 8, 8, adapted to engage respectively with the wheels 3, 3. A rearward extending foot lever 9, secured to the shaft 7 near its center, provides means for turning the shaft to force the scrapers 8, 8 into firm engagement with the wheels.

At each end of the shaft 7 a depending bracket 10 is connected in a manner to permit rotation of the shaft. The lower end of each bracket 10 is provided with an aperture which serves as a bearing for a longitudinally extending horizontal rod 11. The forward end of the rod 11 is rotatably mounted in a bracket 12 depending from one end of the main axle 2. The other end of the bar 11 is bent at right angles and telescopically engages with the hollow inner section of one of the marker bars or arms 13. The outer section of each arm 13 telescopically engages with the inner section and may be secured in place by means of cotter pin 14. Each marker arm carries at its outer end a marker 15 which is preferably a rotary disk, as indicated in the drawings. Between the outer end of the inner section of each arm and the forward end of the corresponding rod 11 there is provided a diagonal brace 16.

Upon each rod 11 at a point adjacent the bracket 10 there is rigidly connected a bracket 17 having an upward extending arm 18 which engages the marker bar at 19. From each bracket 17 there extends inward a lever 20 which is provided at its inner end with a handle or foot rest 21. Each lever 20 may be secured in its horizontal position and the marker in vertical inoperative position by means of a catch 22 with which it resiliently engages. The catches 22 are preferably formed as integral parts of the bearing brackets 6, 6. In operation either of the markers may be used as desired, or, when circumstances require, it is possible to use both markers simultaneously. The marker which is not in use is held inoperative by means of one of the catches 22. The lever 20 of the other marker is sprung out of engagement with its catch, and the marker arm is permitted to drop into operative position as indicated by dotted lines in Fig. 3.

It will be observed that on account of the telescopic construction of the arms, the marker is readily adjustable to vary the distances between the rows.

This application constitutes a division of my copending application for corn planters, filed March 6, 1908, Serial No. 419,434.

I claim—

1. In a planter, the combination with the frame, supporting wheels and seeding mechanism, of a marking device comprising the marker and the supporting shaft therefor mounted longitudinally of the machine in bearings, one of said bearings being carried by the axle and the other by the frame parts to the rear of the supporting wheels.

2. In a planter, the combination with the frame, supporting wheels and seeding mechanism, of a marking device comprising the frame rotatable on an axis disposed longitudinally of the machine, the marker carried by the frame and the lever having approximately a right-angled connection with the frame and adapted to be engaged by a catch mounted upon the planter frame to hold the marker in an uplifted position.

3. In a planter, the combination of a main frame, an axle, supporting wheels for the axle, a longitudinally extending marker shaft, a bearing for the forward end of the marker shaft connected with one forward end of the axle, a bearing for the rear end of the marker shaft connected with the frame, a marker arm rigidly connected with the marker shaft and extending at a substantially right angle thereto, a marker on the end of the arm, and a marker controlling lever at substantially right angles to both the marker shaft and the marker arm.

4. In a planter, the combination of a frame, an axle, supporting wheels for the axle, a longitudinally extending marker shaft outside of the wheel at one side of the machine, a bearing for the forward end of the marker shaft supported on the end of the axle, a bearing for the rear end of the marker shaft supported on the planter frame, a marker arm rigidly connected with the marker shaft and extending at a substantially right angle thereto, a marker on the end of the arm, a marker controlling lever positioned at substantially right angles to both the shaft and the arm, and a latch on the planter frame adapted to engage the lever to hold the marker arm in upright position.

5. In a planter, the combination of a frame, an axle, supporting wheels for the axle, a longitudinal marker shaft at one side of the planter outside of the wheel, a bearing for the forward end of the marker shaft supported on the axle, a bearing for the rear end of the marker shaft supported on the frame, a marker arm connected with the rear end of the marker shaft and extending at a substantially right angle thereto, a marker on the end of the arm, and a diagonal brace extending from the forward end of the marker shaft to the outer part of the marker arm.

6. In a planter, the combination of a frame, an axle, supporting wheels for the frame, a longitudinal marker shaft having its rear end bent at a substantially right angle to the main part, bearings for the marker shaft, a marker arm having an inner tubular section telescoped over the bent rear end of the marker shaft and an outer section telescoped within the tubular section, and a marker at the outer end of the outer section.

7. In a planter, the combination of a frame, an axle, supporting wheels for the axle, a transverse marker shaft at one side of the machine outside of the wheel, a bearing for the forward end of the shaft supported on the end of the axle, a transversely extending bar at the rear end of the frame, a bearing for the rear end of the marker shaft supported on the outer end of the said bar, a marker arm connected to the marker shaft and extending at a substantially right angle thereto, and a marker at the end of the said arm.

8. In a planter, the combination of a frame, an axle, supporting wheels for the axle, a transverse oscillatory shaft at the rear of the frame, scrapers on the shaft adapted to engage the wheels, means for oscillating the shaft to throw the scrapers into or out of engagement, a longitudinal marker shaft, at one side of the machine outside of the wheel, a bearing for the forward end of the marker shaft supported on the end of the axle, a bearing for the rear end of the marker shaft supported on the outer end of the transverse oscillatory shaft, a marker arm connected with the marker shaft at a substantially right angle thereto, and a marker on the outer end of the marker arm.

In testimony whereof I affix my signature, in presence of two witnesses.

JOHN B. BARTHOLOMEW.

Witnesses:
   J. M. CALDWELL,
   L. M. STACY.

---

Copies of this patent may be obtained for five cents each, by addressing the "Commissioner of Patents, Washington, D. C."